US012556679B2

(12) United States Patent
Flick et al.

(10) Patent No.: US 12,556,679 B2
(45) Date of Patent: Feb. 17, 2026

(54) STEREOSCOPIC FLOATING WINDOW METADATA

(71) Applicant: Apple Inc., Cupertino, CA (US)

(72) Inventors: Christopher L. Flick, San Jose, CA (US); Timothy K. Dashwood, Culver City, CA (US)

(73) Assignee: Apple Inc., Cupertino, CA (US)

( * ) Notice: Subject to any disclaimer, the term of this patent is extended or adjusted under 35 U.S.C. 154(b) by 183 days.

(21) Appl. No.: 18/469,945

(22) Filed: Sep. 19, 2023

(65) Prior Publication Data

US 2024/0107000 A1 Mar. 28, 2024

Related U.S. Application Data

(60) Provisional application No. 63/376,884, filed on Sep. 23, 2022.

(51) Int. Cl.
| | |
|---|---|
| *H04N 13/344* | (2018.01) |
| *H04N 13/122* | (2018.01) |
| *H04N 13/128* | (2018.01) |
| *H04N 13/15* | (2018.01) |
| *H04N 13/161* | (2018.01) |
| *H04N 13/178* | (2018.01) |
| *H04N 13/183* | (2018.01) |

(52) U.S. Cl.
CPC ......... *H04N 13/344* (2018.05); *H04N 13/122* (2018.05); *H04N 13/128* (2018.05); *H04N 13/15* (2018.05); *H04N 13/161* (2018.05); *H04N 13/178* (2018.05); *H04N 13/183* (2018.05)

(58) Field of Classification Search
None
See application file for complete search history.

(56) References Cited

U.S. PATENT DOCUMENTS 9,111,352 B2 * 8/2015 Mathur ............... H04N 13/106
10,783,706 B2 9/2020 Pomerantz
(Continued)

OTHER PUBLICATIONS

Klymenko, et al., "Visual Perception in the Field-of-View of Partial Binocular Overlap Helmet-Mounted Displays," Aug. 1994.
(Continued)

*Primary Examiner* — Mohammed Jebari
(74) *Attorney, Agent, or Firm* — Blank Rome LLP

(57) ABSTRACT

Techniques are disclosed for addressing "stereoscopic window violations" in stereoscopic multimedia content. Stereoscopic window violations result in the stereoscopic effect becoming "broken" for the viewer and may occur, e.g., when the left and right stereo eye views in the stereoscopic content are mismatched. Stereoscopic mismatch often occurs at the edges of the left and right eye video image frames (wherein, e.g., a depicted shape may become cut off for a left eye view but not a corresponding right eye view). According to the techniques disclosed herein, rather than permanently masking or otherwise editing the stereoscopic video content to account for any window violations, accompanying stereoscopic window violation metadata information may be generated for the stereoscopic video, which may be used to define a particular geometry for each left and right eye video image frame pair, and used at playback time to crop, mask, or otherwise modify the video image frames.

20 Claims, 9 Drawing Sheets

(56) References Cited

U.S. PATENT DOCUMENTS

| | | | |
|---|---|---|---|
| 10,986,330 B2 | 4/2021 | Dashwood | |
| 11,127,148 B1 | 9/2021 | Edmonds | |
| 2003/0235327 A1* | 12/2003 | Srinivasa | G06V 10/255 |
| | | | 382/104 |
| 2011/0032340 A1 | 2/2011 | Redmann | |
| 2011/0234760 A1* | 9/2011 | Yang | H04N 21/23614 |
| | | | 348/46 |
| 2011/0254926 A1* | 10/2011 | Ushiki | H04N 13/178 |
| | | | 348/46 |
| 2011/0304691 A1* | 12/2011 | Newton | H04N 13/139 |
| | | | 348/E13.001 |
| 2012/0056883 A1* | 3/2012 | Kudo | H04N 13/139 |
| | | | 345/419 |
| 2012/0206569 A1* | 8/2012 | Verdier | G06T 3/4007 |
| | | | 348/E13.064 |
| 2012/0257013 A1* | 10/2012 | Witt | H04N 23/673 |
| | | | 348/E13.064 |
| 2012/0257816 A1* | 10/2012 | Witt | H04N 13/106 |
| | | | 382/154 |
| 2013/0010093 A1* | 1/2013 | Redmann | H04N 13/122 |
| | | | 348/E13.074 |
| 2013/0307928 A1* | 11/2013 | Choe | H04N 13/122 |
| | | | 348/43 |
| 2014/0111623 A1* | 4/2014 | Zhao | H04N 13/128 |
| | | | 348/47 |
| 2015/0271464 A1* | 9/2015 | Suh | H04N 21/43 |
| | | | 375/240.16 |
| 2015/0304640 A1* | 10/2015 | Brooks | H04N 13/122 |
| | | | 348/56 |
| 2017/0171538 A1 | 6/2017 | Bell | |

OTHER PUBLICATIONS

Moffitt, Kirk, "Head-Mounted Display Image Configurations," May 2008.

Sorgi, Lorenzo, "Partial Overlap Stereo," IEEE 2007 3DTV Conference, May 2007.

* cited by examiner

STEREOSCOPIC FLOATING WINDOW METADATA

BACKGROUND

This disclosure relates generally to image processing. More particularly, but not by way of limitation, this disclosure relates to techniques and systems for generating and utilizing stereoscopic window violation metadata information to mitigate the effects of stereoscopic window violations in stereoscopic video content. The term "window," as used herein, refers to the real or virtual screen that may be perceived by a viewer of video content in 3D space (e.g., within a real, virtual, augmented, or otherwise "extended" reality environment).

Stereoscopic window violations may result in the stereoscopic effect becoming "broken" for a viewer and may occur, e.g., when the left and right stereo eye views in the stereoscopic content are mismatched. Stereoscopic mismatch often occurs at the edges of the left and right eye video image frames (wherein, e.g., a depicted object may become fully or partially cut off for a left eye view but not be cut off in a corresponding right eye view). In extreme cases, e.g., when an object is visible in only one stereo eye view, it is referred to as a "monocular object" and may result in unpleasant effects on the viewer, sometimes referred to as "retinal rivalry." A typical solution to this problem, also known as the "floating window" technique, is to crop out or otherwise mask the edge of one eye's image to match the depicted object's visible area in the other eye. One limitation of such techniques is that they can permanently affect the image source and cannot be adjusted later in post-production and/or during presentation, e.g., if the stereoscopic convergence of the scene is later adjusted.

Some electronic devices are capable of generating and presenting so-called "extended reality" (XR) environments on display screens, such as head-mounted displays (HMD), or the like. An XR environment may include a wholly- or partially-simulated environment, including one or more virtual objects, which users of such electronic device can sense and/or interact with. In XR, a subset of a person's physical motions, or representations thereof, may be tracked, and, in response, one or more characteristics of the one or more virtual objects simulated in the XR environment may be adjusted in a manner that comports with at least one law of physics. When stereoscopic video content is displayed in XR environments, novel stereoscopic window violation mitigation techniques may be made possible via the usage of various forms of stereoscopic window violation metadata information, e.g., as generated according to techniques described herein.

DETAILED DESCRIPTION

Figure 1:
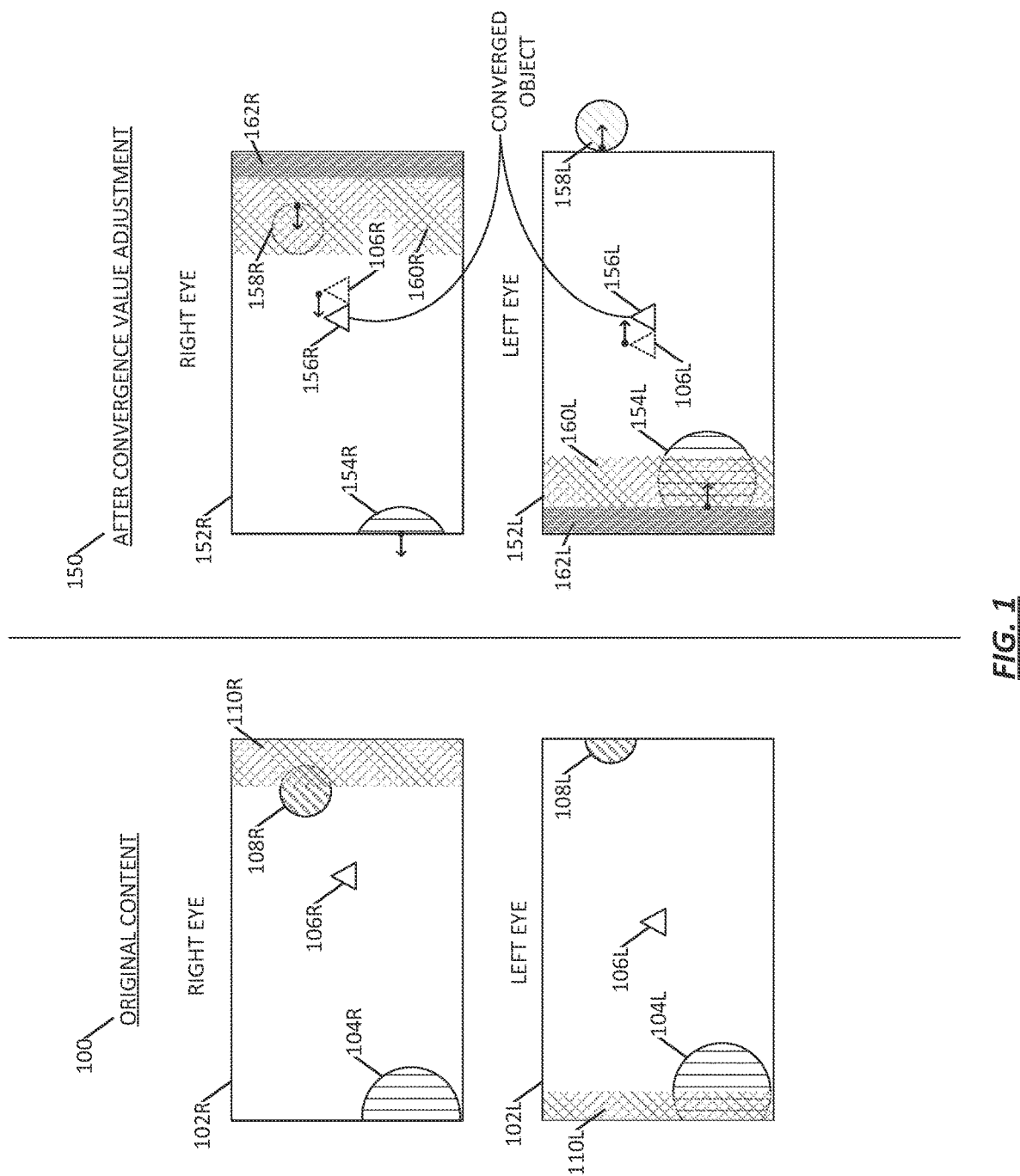
FIG. 1 shows an example of stereoscopic content exhibiting stereoscopic window violations before and after a convergence value for the stereoscopic content is adjusted by a display device, according to one or more embodiments.

This disclosure pertains to systems, methods, and computer readable media to address so-called "stereoscopic window violations" in stereoscopic multimedia content in a non-destructible way. According to the techniques disclosed herein, rather than editing the stereoscopic video content in a permanent way to account for any window violations, accompanying stereoscopic window violation metadata information (e.g., in the form of a timed stereoscopic window violation metadata track associated and/or combined with the stereoscopic video) may be generated for the stereoscopic video. The stereoscopic window violation metadata information may be used to define a particular geometry for each left and right eye video image frame pair (e.g., geometries defined in terms of one or more edge offsets and that are determined to eliminate or mitigate the effects of the stereoscopic window violations) and may also be used at playback time by a playback device to crop or otherwise modify the video image frames "on-the-fly" while they are being displayed on a display screen, in order to mitigate the effects of the stereoscopic window violations in the stereoscopic video content. The metadata track may also be optionally ignored by a playback device for alternative display purposes, such as 2D playback of stereoscopic video.

The techniques described herein may provide enhancements for rendering and presenting graphical information, such as the aforementioned stereoscopic video content, in extended reality (XR) environments. Some XR environments may be filled (or almost filled) with virtual objects or other simulated content (e.g., in the case of pure virtual reality (VR) environments). However, in other XR environments (e.g., in the case of augmented reality (AR) environments, and especially those wherein the user has a wide field of view (FOV), such as a horizontal FOV of 70 degrees or greater), there may be large portions of the user's FOV that have no virtual objects or other simulated content in them at certain times. In other cases, the virtual objects (and/or other simulated content) in an XR environment may be located at such large scene depths that it does not need to be rendered by the electronic device, as it would not take up a noticeable or perceptible portion of the user of the electronic device's FOV.

Thus, what is needed are improved techniques for rendering graphical content, such as stereoscopic video content, in an XR environment that provide for improved stereoscopic window violation mitigation. For example, such improvements may be realized by performing an evaluation of the stereoscopic video content and determining stereoscopic window violation metadata information that may be leveraged as the content is being rendered by an electronic device that is presenting the XR environment, e.g., by cropping or otherwise modifying the transparency and/or color of certain pixels in the video image frames "on-the-fly" while they are being displayed.

In one or more embodiments, a method for utilizing stereoscopic window violation metadata information may comprise: obtaining a first stereoscopic video, wherein the first stereoscopic video comprises: a first plurality of first images representing a left stereo eye view; a second plurality of second images representing a right stereo eye view, wherein each first image in the first plurality has a corresponding second image in the second plurality, and wherein each first image and its corresponding second image comprise a stereoscopic image pair; and stereoscopic window violation metadata information, wherein the stereoscopic window violation metadata information is determined based on estimated occurrences of stereoscopic window violations in the first stereoscopic video and defines at least one offset value for at least one edge of at least one image in a stereoscopic image pair of the first stereoscopic video. Then, the method may proceed by modifying the first stereoscopic video for presentation on the display screen based, at least in part, on the stereoscopic window violation metadata information.

For example, in some embodiments, the at least one offset value may comprise one or more of: a left edge offset, a right edge offset, a top left edge offset, a bottom left edge offset, a top right edge offset, or a bottom right edge offset. In other embodiments, at least one offset value may comprise a "normalized" edge offset value, wherein the normalized edge offset value may be transformed into a resolution-specific edge offset value based, at least in part, on a resolution level of the display screen, and then the first stereoscopic video may be presented on the display screen based, at least in part, on the resolution-specific edge offset value.

In still other embodiments, the stereoscopic window violation metadata information comprises offset value information encoded according to at least one of: a keyframe encoding scheme; or a difference encoding scheme, e.g., a scheme wherein at least a first offset value for an image in a first stereoscopic image pair of the first stereoscopic video is used to determine a second offset value for an image in a second stereoscopic image pair of the first stereoscopic video.

In some embodiments, modifying the first stereoscopic video for presentation on the display screen may comprise performing one or more of the following operations: changing a color value of pixels in an offset region of a given image in the first stereoscopic video (e.g., to black); changing an alpha value of pixels in an offset region of a given image in the first stereoscopic video (e.g., to an alpha value of zero, i.e., transparent); or cropping out pixels located in an offset region of a given image in the first stereoscopic video.

In another one or more embodiments, a method for determining stereoscopic window violation metadata information may comprise: obtaining a first stereoscopic video, wherein the first stereoscopic video comprises: a first plurality of first images representing a left stereo eye view; and a second plurality of second images representing a right stereo eye view, wherein each first image in the first plurality has a corresponding second image in the second plurality, and wherein each first image and its corresponding second image comprise a stereoscopic image pair; determining stereoscopic window violation metadata information for the first stereoscopic video, wherein the stereoscopic window violation metadata information is determined based on estimated occurrences of stereoscopic window violations in the first stereoscopic video and defines at least one offset value for at least one edge of at least one image in a stereoscopic image pair of the first stereoscopic video; and then combining the stereoscopic window violation metadata information with the first stereoscopic video.

In some such embodiments, the stereoscopic window violation metadata information for the first stereoscopic video may further comprise an array of at least one offset value for at least one edge of an image in a stereoscopic image pair of the first stereoscopic video. In other embodiments, the stereoscopic window violation metadata information may comprise a timed stereoscopic window violation metadata track associated with the first stereoscopic video. In some examples, stereoscopic window violation metadata information may be encoded and transmitted to a playback device: with each video image frame, with one or more of the video image frames in a given stereoscopic video; and/or as a separate timed stereoscopic window violation metadata track transmitted along with (e.g., in a same container object) as the stereoscopic video content itself.

Exemplary Extended Reality (XR) Devices

A person can interact with and/or sense a physical environment or physical world without the aid of an electronic device. A physical environment can include physical features, such as a physical object or surface. An example of a physical environment is a physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly- or partially-simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, wearable device, or the like) and adjust graphical content (e.g., stereoscopic video content) and/or auditory content presented to the user—e.g., similarly to how such views and sounds would change in a physical environment. In some situations, the XR system can adjust characteristic(s) of graphical content in response to other inputs, such as a representation of a physical motion (e.g., a vocal command) or stereoscopic window violation metadata information, as will be explained in greater detail below.

Many different types of electronic systems can enable a user to interact with and/or sense an XR environment. A non-exclusive list of examples includes: heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment.

A head mountable system may also have a transparent or translucent display, rather than an opaque display. The transparent or translucent display can have a medium through which light is directed to a user's eyes. The display may utilize various display technologies, such as ULEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies, can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

For purposes of this disclosure, a multiuser communication session can include an XR environment in which two or more devices are participating, while a single user session refers to an XR environment in which only one device is participating.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming—but would nevertheless be a routine undertaking for those of ordinary skill in the design and implementation of graphics rendering systems, having the benefit of this disclosure.

Exemplary Stereoscopic Video Image Content and Window Violations

Referring now to FIG. 1, an example of stereoscopic content exhibiting stereoscopic window violations before (100) and after (150) a convergence value for the stereoscopic content is adjusted by a display device is illustrated, according to one or more embodiments. Original content stereoscopic video image pair 100 comprises various objects (e.g., 104/106/108) at different depths in the depicted scene. Stereoscopic video image pair 100 further comprises a right eye stereo view (102R) and a left eye stereo view (102L) of the same depicted scene. The objects in the depicted scene may each have different amounts of (positive or negative) parallax. As used herein, negative parallax refers to objects that appear to be in front of the screen plane, and positive parallax refers to objects that appear to be behind the screen plane. For example, in the case of stereoscopic video image pair 100, object 104 (as represented in both right eye stereo view 102R as object 104R and in left eye stereo view 102L as object 104L) exhibits negative parallax, i.e., it may appear to be protruding out of the screen to a viewer. Similarly, in this example, object 108 (as represented in both right eye stereo view 102R as object 108R and in left eye stereo view 102L as object 108L) exhibits negative parallax and object 106 (as represented in both right eye stereo view 102R as object 106R and in left eye stereo view 102L as object 106L) exhibits positive parallax, i.e., it may appear to be exist behind the screen to a viewer. As may be appreciated, objects 104/108 exhibiting negative parallax appear to shift to the right when comparing their relative positions from the right eye stereo view 102R to the left eye stereo view 102L, while object 106 exhibiting positive parallax appears to shift to the left when comparing its relative position from the right eye stereo view 102R to the left eye stereo view 102L.

As shown in stereoscopic video image pair 100 (which represents this exemplary scene content before adjusting a convergence value), there is a default floating window cropped region 110R for right eye stereo view 102R, as well as a default floating window cropped region 110L for left eye stereo view 102L. As will be described below, these default floating window cropped regions may be specified in metadata that is combined with and/or otherwise transmitted with the stereoscopic video content itself. Looking more closely at the size and positioning of default floating window cropped (and/or masked) region 110L, it may be observed that it is sized such that a viewer would see the same amount of object 104 in both the right eye stereo view, shown at 104R, and the left eye stereo view, shown at 104L. Similarly, looking more closely at the size and positioning of default floating window cropped (and/or masked) region 110R, it may be observed that it is sized such that a viewer would see the same amount of object 108 in both the right eye stereo view, shown at 108R, and the left eye stereo view, shown at 108L. By eliminating this "mismatch" via the use of floating windows, viewer eye strain and/or retinal rivalry issues may be mitigated.

Turning now to convergence-adjusted stereoscopic video image pair 150, corresponding objects (e.g., 154/156/158) are shown at different depths in the depicted scene. Stereoscopic video image pair 150 further comprises a right eye stereo view (152R) and a left eye stereo view (152L) after the convergence value of the depicted scene has been adjusted, e.g., on a display device. As was the case in the stereoscopic video image pair 100, object 154 (which corresponds to object 104) and object 158 (which corresponds to object 108) exhibit negative parallax, while object 156 (which corresponds to object 106) exhibits positive parallax.

As shown by the small arrows in stereoscopic video image pair 150 (which represents this exemplary scene content after a convergence value has been adjusted), the objects 154R/156R/158R in the right eye stereo view 152R have shifted by a small amount to the left from their corresponding positions in stereoscopic video image pair 100. Likewise, the objects 154L/156L/158L in the left eye stereo view 152L have shifted by a small amount to the right from their corresponding positions in stereoscopic video image pair 100. Object 156 may now be said to be a "converged" object, as its horizontal position at 156R in the in the right eye stereo view 152R of the depicted scene and at 156L in the in the right eye stereo view 152L are now aligned. In stereoscopic video image pair 150, there is also shown an updated floating window cropped region 160R for right eye stereo view 152R, as well as an updated floating window cropped region 160L for left eye stereo view 152L.

Looking more closely at the size and positioning of updated floating window cropped region 160L, it may be observed that it is sized such that there would be a region of missing pixels 162L in the left eye stereo view 152L after the horizontal translation caused by the adjustment of the convergence value. Similarly, looking more closely at the size and positioning of updated floating window cropped region 160R, it may be observed that it is sized such that there would be a region of missing pixels 162R in the right eye stereo view 152R after the horizontal image translation caused by the adjustment of the convergence value.

It may also be observed that a viewer would see the same amount of object 154 in both the right eye stereo view, shown at 154R, and the left eye stereo view, shown at 154L, but, due to the translation caused by the convergence adjustment, a viewer would actually not see object 158, due to the position of the updated floating window 160R in the right eye stereo view 152R and the translation of object 158 to position 158L in the left eye stereo view 152L, which is now completely "off screen," i.e., object 158 would become a monocular object in stereoscopic video image pair 150, if not for the updated floating window position 160R completely covering object 158R. By eliminating this "mismatch" via the use of floating windows, viewer eye strain and retinal rivalry may be reduced.

Exemplary Stereoscopic Window Violation Mitigation Techniques

Figure 2A:
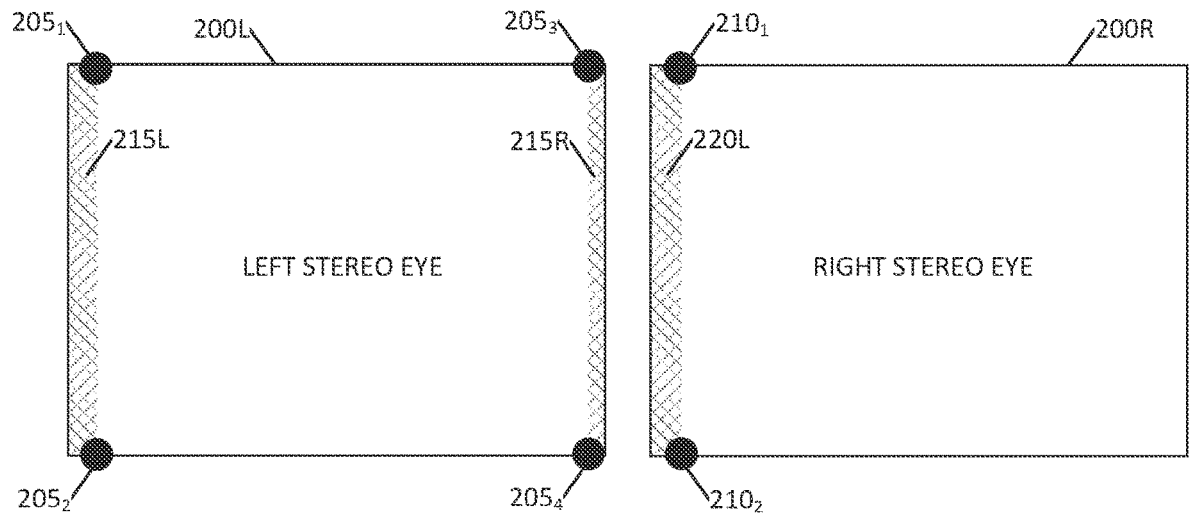
FIG. 2A shows an example of left and right stereo eye offsets to mitigate stereoscopic window violations, according to one or more embodiments.

Referring now to FIG. 2A, an example 200 of left and right stereo eye offsets to mitigate stereoscopic window violations is illustrated, according to one or more embodiments. In example 200, a floating window cropped region has been defined for left stereo eye view 200L that comprises cropping out region 215L on the left edge of left stereo eye view 200L and region 215R on the right edge of left stereo eye view 200L. In this example, the bounds of the floating window region of left stereo eye view 200L remaining after the cropping operation may be defined by the set of four corner points $205_1$-$205_4$. In this example, the pair of corner points $205_1/205_2$ (as well as the pair of corner points $205_3/205_4$), form a straight vertical line along the left (and right) edges of the left stereo eye view 200L, though, as will be discussed later, in other embodiments, it is not essential that the defined left and right edge offsets comprise vertical lines (i.e., they may non-parallel with the respective left and right edges of their respective stereo eye view, if so desired).

As yet another example, a different floating window cropped region has been defined for right stereo eye view 200R of the same stereoscopic image pair that only comprises cropping out region 220L on the left edge of right stereo eye view 200R and does not crop out any region on the right edge of right stereo eye view 200R. As may be understood, this is merely one exemplary way in which the geometries (i.e., metes and bounds) of the floating windows for each stereo eye view may be defined and encoded into metadata associated with a given stereoscopic image pair.

Figure 2B:
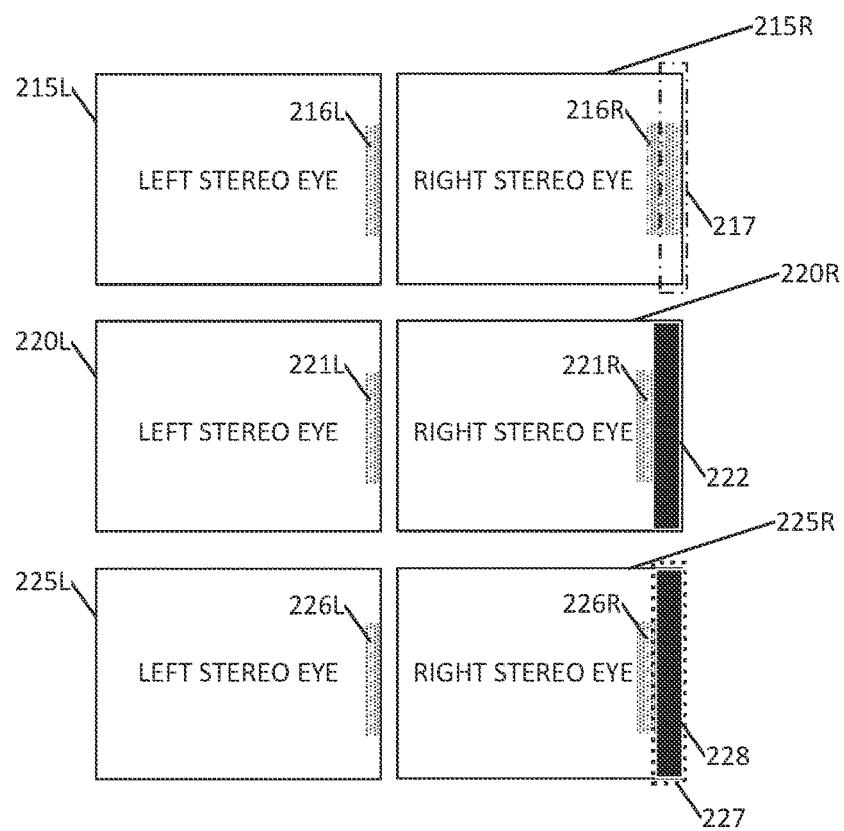
FIG. 2B shows an example of various mitigation strategies for stereoscopic window violations, according to one or more embodiments.

Referring now to FIG. 2B, an example of various mitigation strategies for stereoscopic window violations is illustrated, according to one or more embodiments. Exemplary stereoscopic image pair 215 (comprising left stereo eye view 215L and right stereo eye view 215R) depicts an object 216 exhibiting stereoscopic mismatch between its depiction 216L in left stereo eye view 215L and its depiction 216R in right stereo eye view 215R, in particular that more of the object 216 is visible in depiction 216R in right stereo eye view 215R. In exemplary stereoscopic image pair 215, there is no awareness or mitigation treatment applied to mismatch region 217, thereby leading to the aforementioned retinal rivalry and undesirable viewing experience for a viewer.

Another approach to stereoscopic window violation mitigation is shown in exemplary stereoscopic image pair 220 (comprising left stereo eye view 220L and right stereo eye view 220R) depicts an object 221 exhibiting stereoscopic mismatch between its depiction 221L in left stereo eye view 220L and its depiction 221R in right stereo eye view 220R, in particular that more of the object 221 is visible in depiction 221R in right stereo eye view 220R. In exemplary stereoscopic image pair 220, the mitigation treatment applied to mismatch region 222 is to simply "black out" or "paint out" the mismatching pixels, thereby eliminating any stereo window violations that would cause an unpleasant viewing experience for a viewer. However, the mitigation treatment applied to exemplary stereoscopic image pair 220 is "baked in" to the video content itself, and thus is not flexible or changeable at the presentation device, and also may not be the most effective mitigation strategy for certain viewing environments, such as XR environments, wherein stereoscopic video content may be playing over a 'real world' background (e.g., a viewer's living room), wherein a large black bar on the edge of the right stereo eye view would not look natural.

Yet another (more flexible and lightweight) approach to stereoscopic window violation mitigation is shown in exemplary stereoscopic image pair 225 (comprising left stereo eye view 225L and right stereo eye view 225R) depicts an object 226 exhibiting stereoscopic mismatch between its depiction 226L in left stereo eye view 225L and its depiction 226R in right stereo eye view 225R, in particular that more of the object 226 is visible in depiction 226R in right stereo eye view 225R. In exemplary stereoscopic image pair 225, the mitigation treatment applied to mismatch region 227 involves specifying the boundaries of region 227, e.g., in the form of stereoscopic window violation metadata information, which may include defining one or more edge offsets and/or corner points describing the geometry of the floating window region, as described above with reference to FIG. 2A.

By defining the floating window region in this flexible and lightweight manner, a presentation device may elect to enact its preferred stereo window violation mitigation strategy on-the-fly, i.e., at display time. For example, the presentation device may elect to "black out" or "paint out" the mismatching pixels 228 (as described above with reference to exemplary stereoscopic image pair 220), thereby eliminating any stereo window violations that would cause an unpleasant viewing experience for a viewer. However, the presentation device may also elect a different mitigation treatment at display time, such as changing an alpha value of pixels in region 227 to zero (i.e., making them transparent), which may be a more effective mitigation strategy for certain viewing environments, such as XR environments, wherein stereoscopic video content may be playing over a 'real world' background (e.g., a viewer's living room), wherein a transparent region on the edge of the right stereo eye view would not cause any discomfort to the viewer.

Figure 2C:
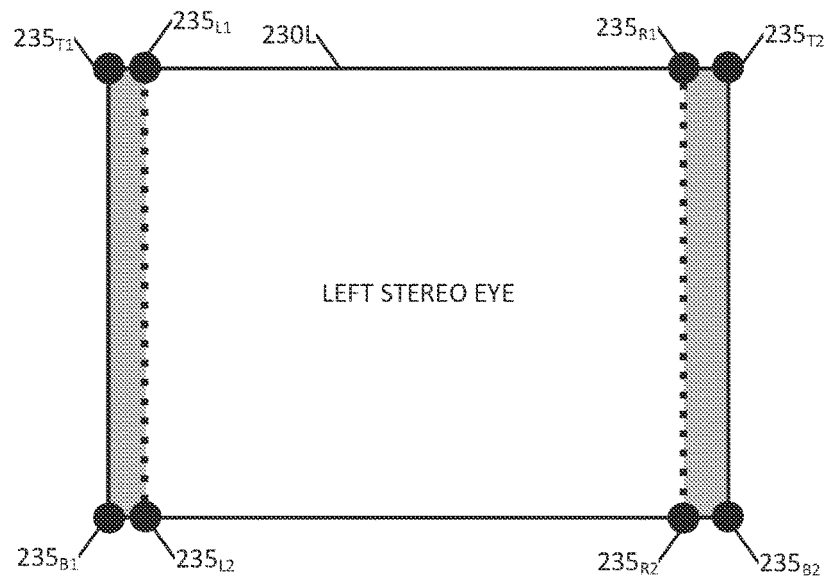
FIG. 2C shows exemplary offset values for the edges of an exemplary image from a stereoscopic image pair, according to one or more embodiments.
Figure 2C:
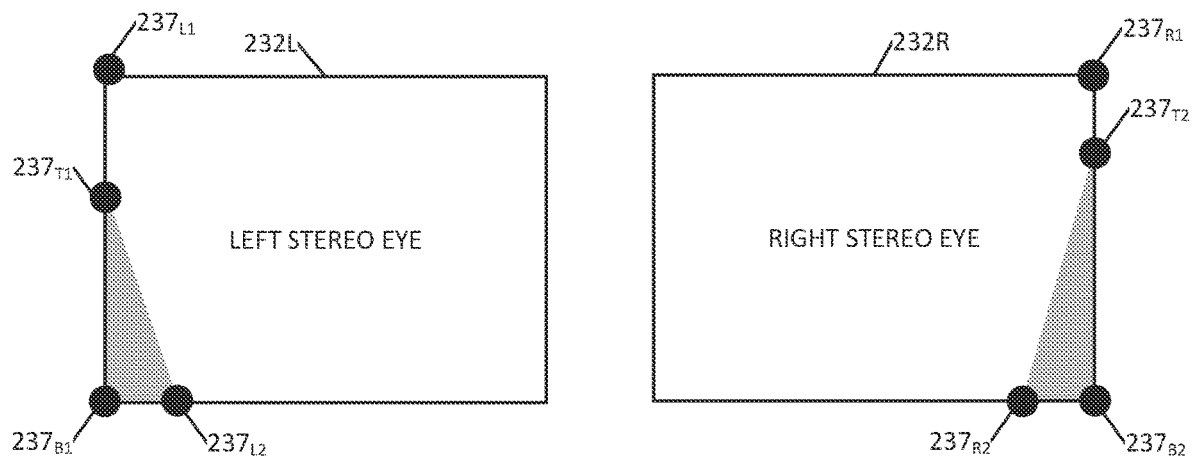

Referring now to FIG. 2C, exemplary offset values for the edges of an exemplary image (230L) from a stereoscopic image pair is illustrated, according to one or more embodiments. In the example of exemplary image 230L, the floating window region is defined by eight corner points. As mentioned above, the scheme shown in FIG. 2C simply allows the geometry of the floating window region to be described with more specificity—and does not restrict the offset edges to being parallel with the edges of the original stereo eye image frame.

For example, the floating window region for exemplary image 230L is defined by: a first left offset value along the top edge ($235_{L1}$); a second left offset value along the bottom edge ($235_{L2}$); a first right offset value along the top edge ($235_{R1}$); a second right offset value along the bottom edge ($235_{R2}$); a first top offset value along the left edge ($235_{T1}$); a second top offset value along the right edge ($235_{T2}$); a first bottom offset value along the left edge ($235_{B1}$); a second bottom offset value along the right edge ($235_{B2}$). By adjusting these eight offset values, the floating windows may exist on horizontal and/or vertical edges (e.g., causing a dynamic adjustment to the image's aspect ratio), may be angled, and may be defined independently for each stereo view in a given stereoscopic image pair. As illustrated with respect to exemplary image 230L, typical left edge and right edge image crops are shown, as defined by the vertical dashed line connecting points $235_{L1}$ and $235_{L2}$ on the left side of the image and the vertical dashed line connecting points $235_{R1}$ and $235_{R2}$ on the left side of the image.

According to another example shown in FIG. 2C, there is illustrated an exemplary stereoscopic image pair comprising exemplary left stereo eye image 232L and exemplary left stereo eye image 232R. As illustrated with respect to exemplary images 232L/232R, the four points of the inner shape (e.g., points $237_{L1}$, $237_{T1}$, $237_{B1}$, and $237_{L2}$ in the case of left stereo eye image 232L, and points $237_{B1}$, $237_{T2}$, $237_{B2}$, and $237_{R2}$ in the case of right stereo eye image 232R) are trapezoidal, i.e., having a wider top than bottom. Exemplary images 232L/232R also illustrate an exemplary scenario wherein the vertical starting position of the respective cropped regions is below the tops of the respective image frames. This situation would represent a floating window use case wherein, e.g., a camera is close to the ground plane.

In some embodiments, an edge offset of zero may simply mean that there is no offset from the stereoscopic image view's original edge, while a number value may indicate a number of pixels away from the edge that the offset should be placed. In still other embodiments, at least one edge offset value may comprise a "normalized" edge offset value, wherein the normalized edge offset value may be transformed into a resolution-specific edge offset value based, at least in part, on a resolution level of the display screen. For example, an edge offset value divided by an axial dimension (e.g., an image width or height value) can be interpreted as a rational number and may be used if the video is scaled to a different resolution at display time. According to some embodiments, to further efficiency, edges offsets that are zero do not need to be encoded, and, if all edge offsets for a given stereoscopic image view are zero, then no floating window needs to be defined at all. Ideally, when floating window edges are not angled, i.e., are straight lines parallel with the edges of the image frame, the second edge offsets for the vertical and/or horizontal edges also do not need to be encoded (i.e., since they would be identical to their corresponding first edge offset values). In yet other embodiments, other shapes for defining the floating window region are also possible (i.e., other than quadrilaterals, as have been discussed above). For example, saliency maps or other considerations may be used to help define the floating window regions for a given stereoscopic image pair.

In other embodiments, to further improve efficiency, the stereoscopic window violation metadata information may be encoded according to at least one of: a keyframe encoding scheme, or a difference encoding scheme. According to a keyframe encoding scheme, the offset values determined for a given image frame may be specified in a more lightweight fashion with reference to a full set of edge offset values encoded for a nearby "keyframe," wherein keyframes may only be specified for every nth image frame in the stereoscopic video (e.g., every $10^{th}$ image frame, every $30^{th}$ image frame, etc.). Similarly, a difference encoding scheme may only encode the edge offsets for a particular frame in terms of their differences from those of a nearby reference image frame. Thus, e.g., if a particular edge offset (e.g., the left edge) does not change over a large number of consecutive images in a particular stereoscopic video, then no new edge offset information would need to be encoded—simply an indication of 'no difference' from a previous image frame's edge offset. In still other embodiments, stereoscopic window violation metadata information may also be defined that is "global" for an entire stereoscopic video, i.e., not image frame-specific, e.g., a total depth bracket for an entire given video.

Another benefit of the techniques described herein is that, if the video content itself has encryption, digital rights management (DRM) or other content protection techniques applied to it, the methods described herein could analyze and determine what stereoscopic window violation metadata to associate with the video—without having to decrypt or unprotect the video content. In other words, the stereoscopic window violation metadata information could be authored after the video content was encoded, and it would not need to be reintegrated into the already-protected video content—it could simply be included in the same file container object as the video content.

Figure 2D:
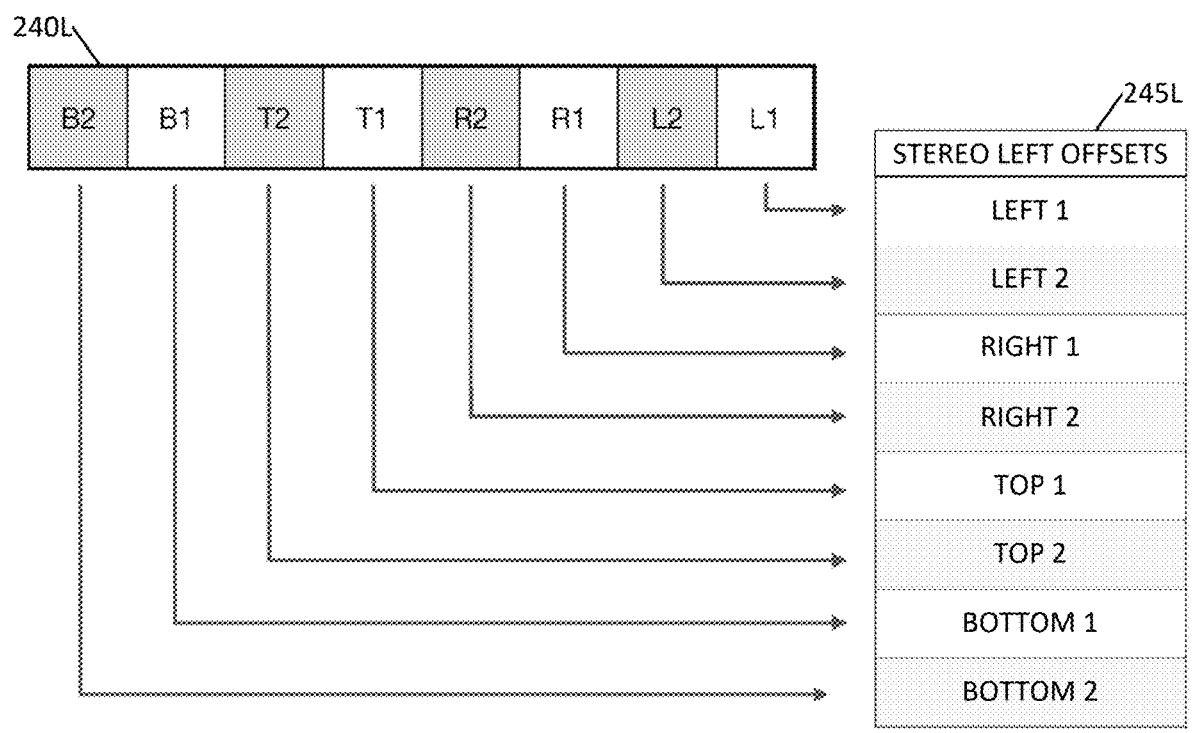
FIG. 2D shows an example of an array containing exemplary offset values for the edges of a floating window for an exemplary image from a stereoscopic image pair, according to one or more embodiments.

Referring now to FIG. 2D, an example of an array (240L) containing exemplary offset values for the edges of a floating window of an exemplary image (230L) from a stereoscopic image pair is illustrated, according to one or more embodiments. As illustrated in table 245L: the "Left 1" stereo left offset ($235_{L1}$) corresponds to the value 'L1' in the array 240L; the "Left 2" stereo left offset ($235_{L2}$) corresponds to the value 'L2' in the array 240L; the "Right 1" stereo left offset ($235_{R1}$) corresponds to the value 'R1' in the array 240L; the "Right 2" stereo left offset ($235_{R2}$) corresponds to the value 'R2' in the array 240L; the "Top 1" stereo left offset ($235_{T1}$) corresponds to the value 'T1' in the array 240L; the "Top 2" stereo left offset ($235_{T2}$) corresponds to the value 'T2' in the array 240L; the "Bottom 1" stereo left offset ($235_{B1}$) corresponds to the value 'B1' in the array

240L; and the "Bottom 2" stereo left offset ($235_{B2}$) corresponds to the value 132' in the array 240L. It is to be understood that a corresponding array (e.g., 240R, not pictured) could also be defined, i.e., containing offset values for the edges of a floating window of the other exemplary image (e.g., 230R, not pictured) from the same stereoscopic image pair that image 230L is a part of. It is to be understood that the eight exemplary values stored in array 240L could alternatively be used to store eight offset values corresponding to the two images of a given stereoscopic image pair (e.g., four offset values for each image in the pair), as described above with reference to exemplary images 232L/232R of FIG. 2C, or any other collection of offset values that are needed to define the floating window geometries in a given implementation.

In some embodiments, a data structure configured to contain the offset values for the edges of a floating window of an exemplary image (e.g., as shown in array 240L) may be designed that could be carried in a stereo multiview high efficiency video coding (MV-HEVC) supplemental enhancement information (SEI) object to indicate the floating window mask shape (i.e., the floating window's geometry). In some such embodiments, a single SEI may be able to be shared across both views of a stereoscopic image pair.

Figure 3A:
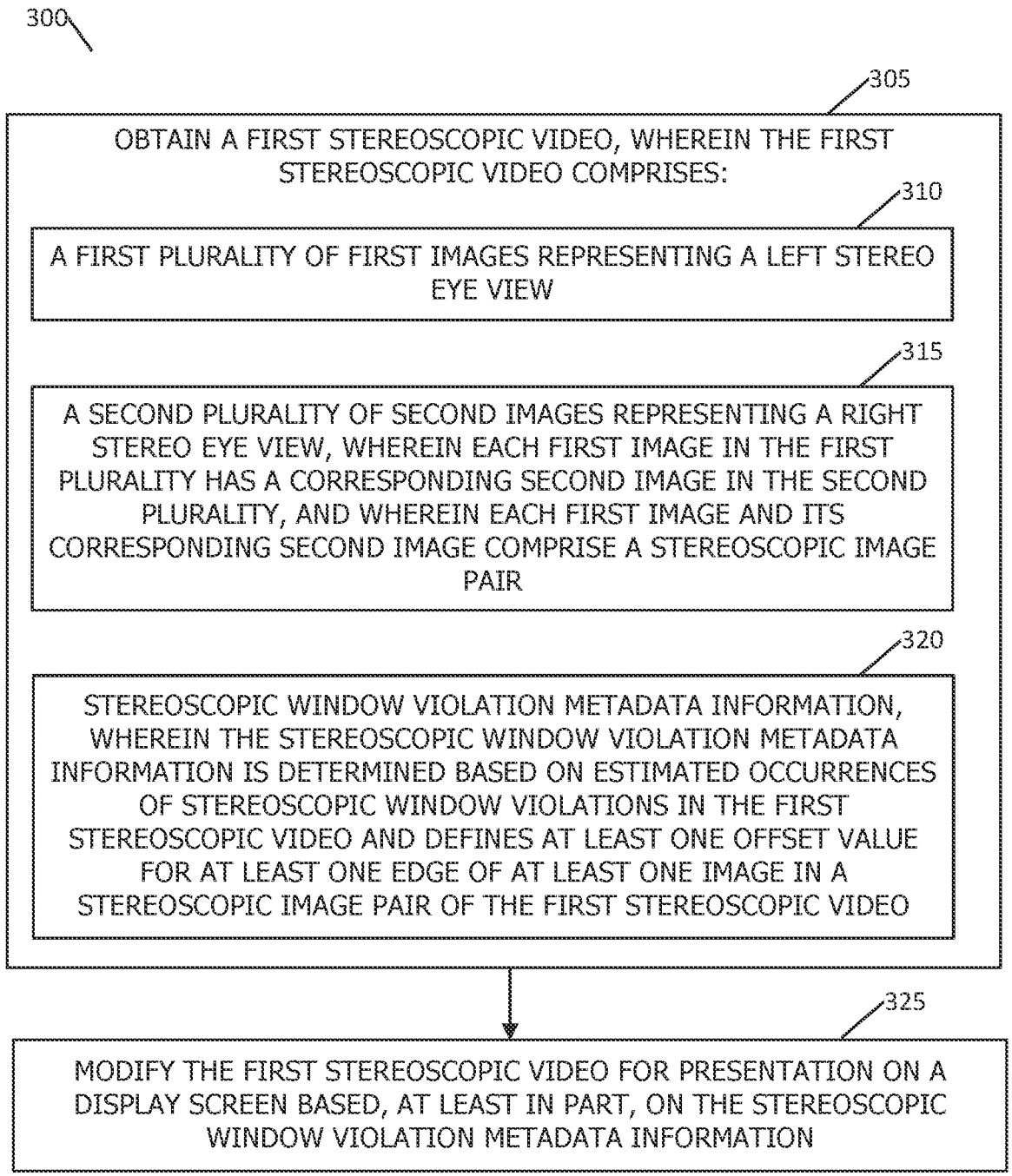
FIG. 3A shows a flowchart of a technique for utilizing stereoscopic window violation metadata information to modify the presentation of stereoscopic video in order to mitigate stereo window violations, according to one or more embodiments.

Exemplary Methods of Determining and Utilizing Stereoscopic Window Violation Metadata Referring now to FIG. 3A, a flowchart 300 of a technique for utilizing stereoscopic window violation metadata information to modify the presentation of stereoscopic video in order to mitigate stereo window violations is shown, according to one or more embodiments. First, at step 305, the method 300 may obtain a first stereoscope video, e.g., either by downloading an entire stereoscopic video file or by streaming portions of the first stereoscope video in real time. In some embodiments, the first stereoscopic video comprises: a first plurality of first images representing a left stereo eye view (310); a second plurality of second images representing a right stereo eye view (315), e.g., wherein each first image in the first plurality has a corresponding second image in the second plurality, and wherein each first image and its corresponding second image comprise a stereoscopic image pair; and stereoscopic window violation metadata information, wherein the stereoscopic window violation metadata information is determined based on estimated occurrences of stereoscopic window violations in the first stereoscopic video and defines at least one offset value for at least one edge of at least one image in a stereoscopic image pair of the first stereoscopic video (320).

As described above, the stereoscopic window violation metadata may be stored in an array or other data structure and may be encoded and obtained by a playback device: along with each video image frame in a given stereoscopic video; along with one or more (but not each) of the video image frames in a given stereoscopic video; and/or as a separate timed stereoscopic window violation metadata track, e.g., that may be stored in a same container object as the stereoscopic video content itself. In some embodiments, multiple stereoscopic window violation metadata tracks could be transmitted along with the same stereoscopic video content, e.g., a first track to be used with a first convergence point, and a second track to be used with a second convergence point, etc.

Finally, at step 325, the playback device may modify the first stereoscopic video for presentation on the display screen based, at least in part, on the stereoscopic window violation metadata information, in order to mitigate the effects of the estimated occurrences of stereoscopic window violations. It is to be noted that a given playback device could also further modify presentation based on its own preferences and/or implementation-specific needs (e.g., by changing the convergence of the scene via horizontal image translation, as illustrated in FIG. 1), i.e., by not exactly following the mitigation approach that would be suggested based on the received stereoscopic window violation metadata information. As described above, modifying the first stereoscopic video for presentation on the display screen at step 325 may comprise performing one or more of the following operations: changing a color value of pixels in an offset region of a given image in the first stereoscopic video (e.g., to black); changing an alpha value of pixels in an offset region of a given image in the first stereoscopic video (e.g., to an alpha value of zero, i.e., transparent); or cropping out pixels located in an offset region of a given image in the first stereoscopic video.

In the case of presenting stereoscopic video content in an XR environment, one or more of the modification techniques (e.g., the changing of alpha values of pixels in offset regions of given images in a stereoscopic video) may result in more of the real-world content of the viewer's environment being visible on the display screen, such as around the peripheral edges of the presentation of the stereoscopic video content.

Figure 3B:
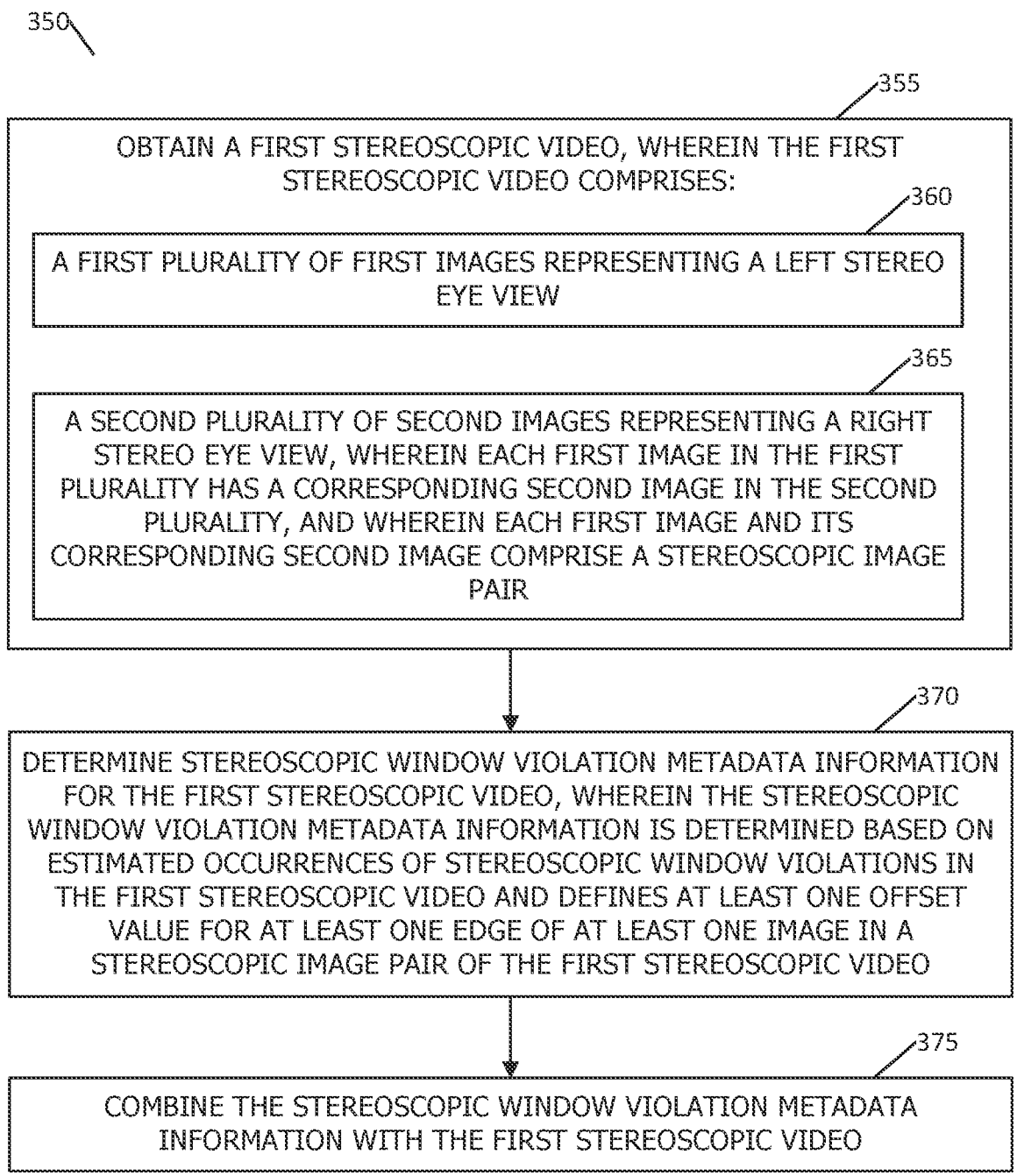
FIG. 3B shows a flowchart of another technique to determine stereoscopic window violation metadata information that may be used to modify the presentation of stereoscopic video in order to mitigate stereo window violations, according to one or more embodiments.

Referring now to FIG. 3B, a flowchart 350 of another technique to determine stereoscopic window violation metadata information that may be used to modify the presentation of stereoscopic video in order to mitigate stereo window violations is shown, according to one or more embodiments. First, at step 355, the method 350 may obtain a first stereoscope video, e.g., a stereoscopic video that has either been authored (e.g., by a filmmaker or other content producer) or downloaded or otherwise received from a third party. In some embodiments, the first stereoscopic video comprises: a first plurality of first images representing a left stereo eye view (360); a second plurality of second images representing a right stereo eye view (365), e.g., wherein each first image in the first plurality has a corresponding second image in the second plurality, and wherein each first image and its corresponding second image comprise a stereoscopic image pair.

Next, at step 370, the method 350 may determine stereoscopic window violation metadata information for the first stereoscopic video, wherein the stereoscopic window violation metadata information is determined based on estimated occurrences of stereoscopic window violations in the first stereoscopic video and defines at least one offset value for at least one edge of at least one image in a stereoscopic image pair of the first stereoscopic video. In some embodiments, the stereoscopic window violation metadata information may be determined algorithmically, e.g., based on one or more pieces of metadata embedded in the originally captured video content, such as: an interaxial distance of the capturing lenses, a min/max depth bracket for the video (or portions thereof), a depth map track for the video, a scene mesh track, a scene geometry track, and so on.

Finally, at step 375, the method 350 may combine the stereoscopic window violation metadata information with the first stereoscopic video, e.g., by combining the stereoscopic window violation metadata information with each individual video image frame in the first stereoscopic video, with one or more of the video image frames in the first stereoscopic video; and/or as a separate timed stereoscopic window violation metadata track transmitted along with (e.g., in a same container object) as the in the first stereoscopic video.

Exemplary Block Diagram

Figure 4:
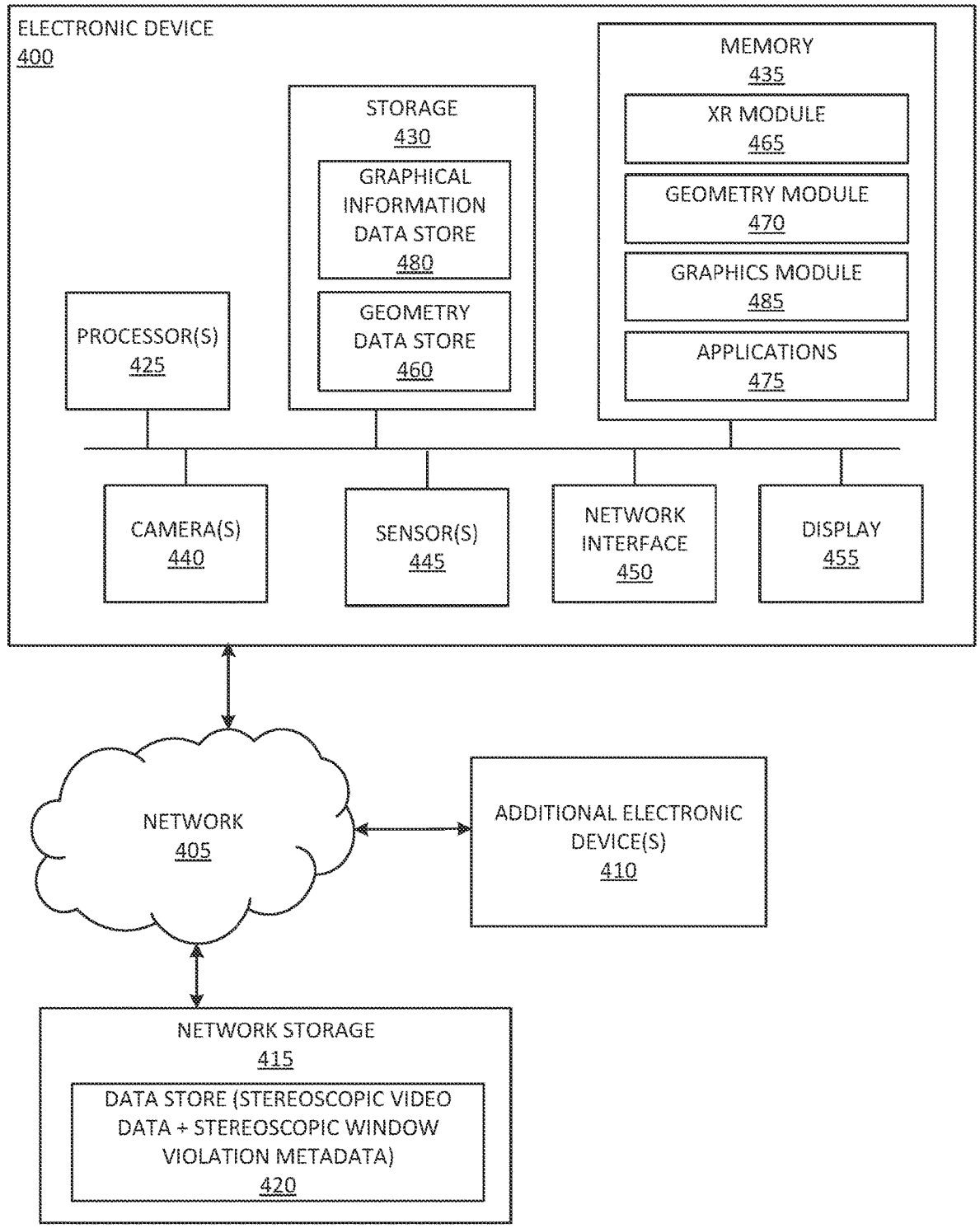
FIG. 4 shows, in block diagram form, a simplified system diagram according to one or more embodiments.

Referring now to FIG. 4, a simplified block diagram of an electronic device 400 is depicted, communicably connected to additional electronic devices 410 and a network storage 415 over a network 405, in accordance with one or more embodiments of the disclosure. Electronic device 400 may be part of a multifunctional device, such as a mobile phone, tablet computer, personal digital assistant, portable music/video player, wearable device, head-mounted systems, projection-based systems, base station, laptop computer, desktop computer, network device, or any other electronic systems such as those described herein. Electronic device 400, additional electronic device 410, and/or network storage 415 may additionally, or alternatively, include one or more additional devices within which the various functionality may be contained, or across which the various functionality may be distributed, such as server devices, base stations, accessory devices, and the like. Illustrative networks, such as network 405 include, but are not limited to, a local network such as a universal serial bus (USB) network, an organization's local area network, and a wide area network such as the Internet. According to one or more embodiments, electronic device 400 may be utilized to participate in a single user or multiuser communication session in an XR environment. It should be understood that the various components and functionality within electronic device 400, additional electronic device 410 and network storage 415 may be differently distributed across the devices, or they may be distributed across additional devices.

Electronic Device 400 may include one or more processors 425, such as a central processing unit (CPU). Processor(s) 425 may include a system-on-chip such as those found in mobile devices and include one or more dedicated graphics processing units (GPUs). Further, processor(s) 425 may include multiple processors of the same or different type. Electronic device 400 may also include a memory 435. Memory 435 may include one or more different types of memory, which may be used for performing device functions in conjunction with processor(s) 425. For example, memory 435 may include cache, ROM, RAM, or any kind of transitory or non-transitory computer readable storage medium capable of storing computer readable code. Memory 435 may store various programming modules for execution by processor(s) 425, including XR module 465, geometry module 470, graphics module 485, and other various applications 475. Electronic device 400 may also include storage 430. Storage 430 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Electronic device may additionally include a network interface 450, from which the electronic device 400 can communicate across network 405.

Electronic device 400 may also include one or more cameras 440 or other sensors 445, such as depth sensor(s), from which depth or other characteristics of an environment may be determined. In one or more embodiments, each of the one or more cameras 440 may be a traditional RGB camera, or a depth camera. Further, cameras 440 may include a stereo- or other multi-camera system, a time-of-flight camera system, or the like. Electronic device 400 may also include a display 455. The display device 455 may utilize digital light projection, OLEDs, LEDs, ULEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Storage 430 may be utilized to store various data and structures which may be utilized for providing state information in order to manage geometry data for physical environments of a local user and/or a remote user. Storage 430 may include, for example, geometry data store 460. Geometry data store 460 may be utilized to store data related to one or more physical environments in which electronic device 400 participates, e.g., in a single user session or a multiuser communication session. For example, geometry data store 460 may store characteristics of a physical environment, which may affect available space for presentation of components (e.g., stereoscopic videos) during a single user sessions or multiuser communication sessions. As another example, geometry data store 460 may store characteristics of a physical environment, which may affect how a user is able to move around or interact with the physical environment around the device. Storage 430 may further include, for example, graphical information data store 480. Graphical information data store 480 may store characteristics of graphical information (e.g., depth information and/or color information) that may be composited and rendered in an image frame containing a representation of all or part of the user's physical environment. Additionally, or alternatively, geometry data, graphical information data, and/or stereoscopic video image data (such as stereoscopic window violation metadata) may be stored across network 405, such as by data store 420.

According to one or more embodiments, memory 435 may include one or more modules that comprise computer readable code executable by the processor(s) 425 to perform functions. The memory may include, for example, an XR module 465, which may be used to process information in an XR environment. The XR environment may be a computing environment which supports a single user experience by electronic device 400, as well as a shared, multiuser experience, e.g., involving collaboration with an additional electronic device(s) 410.

The memory 435 may also include a geometry module 470, for processing information regarding the characteristics of a physical environment, which may affect how a user moves around the environment or interacts with physical and/or virtual objects within the environment. The geometry module 470 may determine geometric characteristics of a physical environment, for example from sensor data collected by sensor(s) 445, or from pre-stored information, such as from geometry data store 460. Applications 475 may include, for example, computer applications that may be experienced in an XR environment by one or multiple devices, such as electronic device 400 and additional electronic device(s) 410. The graphics module 485 may be used, e.g., for processing information regarding characteristics of graphical information, including depth and/or color information, which may or may not be composited into an image frame depicting all or part of a user's physical environment)

Although electronic device 400 is depicted as comprising the numerous components described above, in one or more embodiments, the various components may be distributed across multiple devices. Accordingly, although certain processes are described herein, with respect to the particular systems as depicted, in one or more embodiments, the various processes may be performed differently, based on the differently-distributed functionality. Further, additional components may be used, some combination of the functionality of any of the components may be combined.

Exemplary Electronic Devices

Figure 5A:
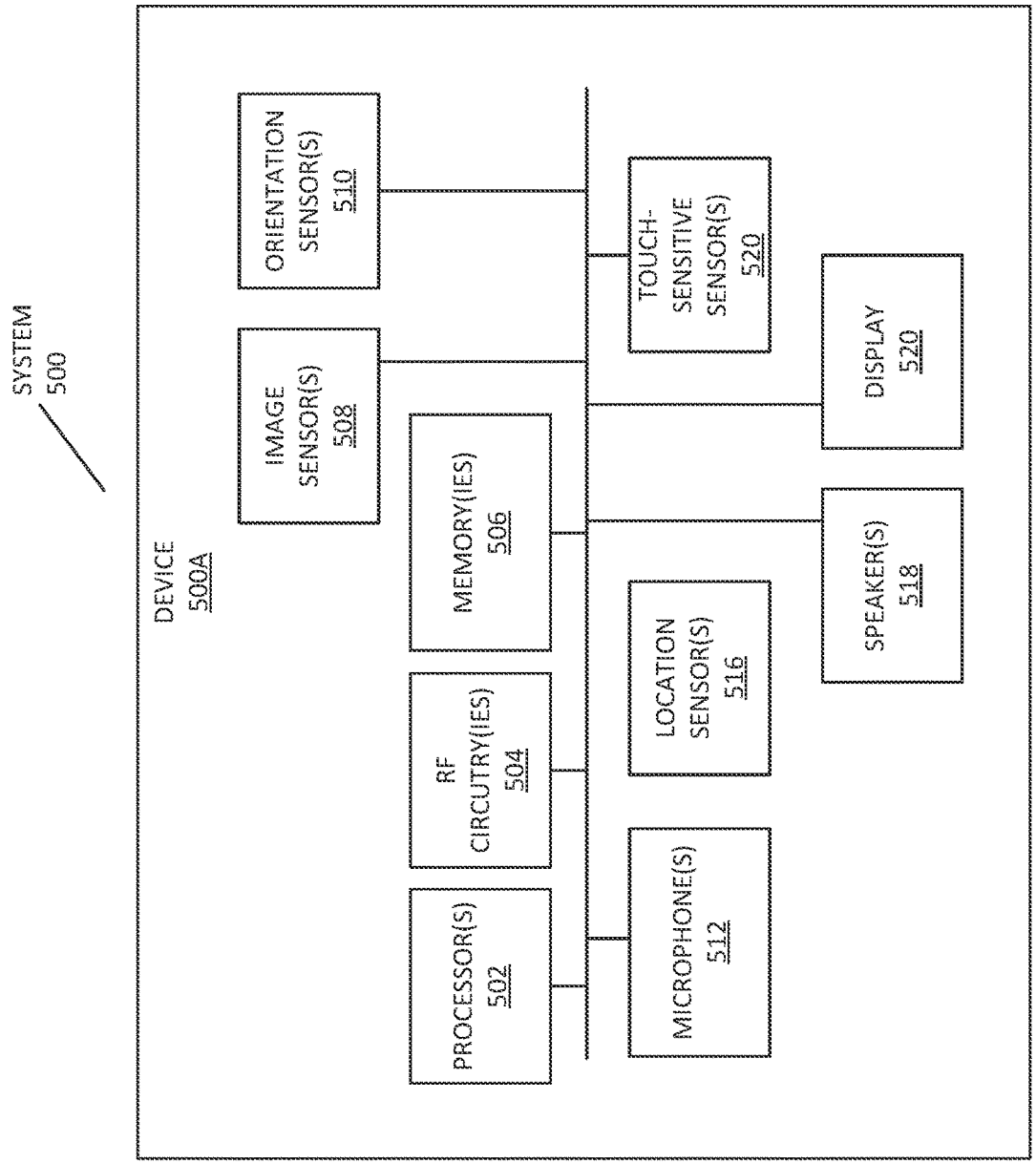
FIGS. 5A-5B show exemplary systems for use in various computer-simulated XR technologies.
Figure 5B:
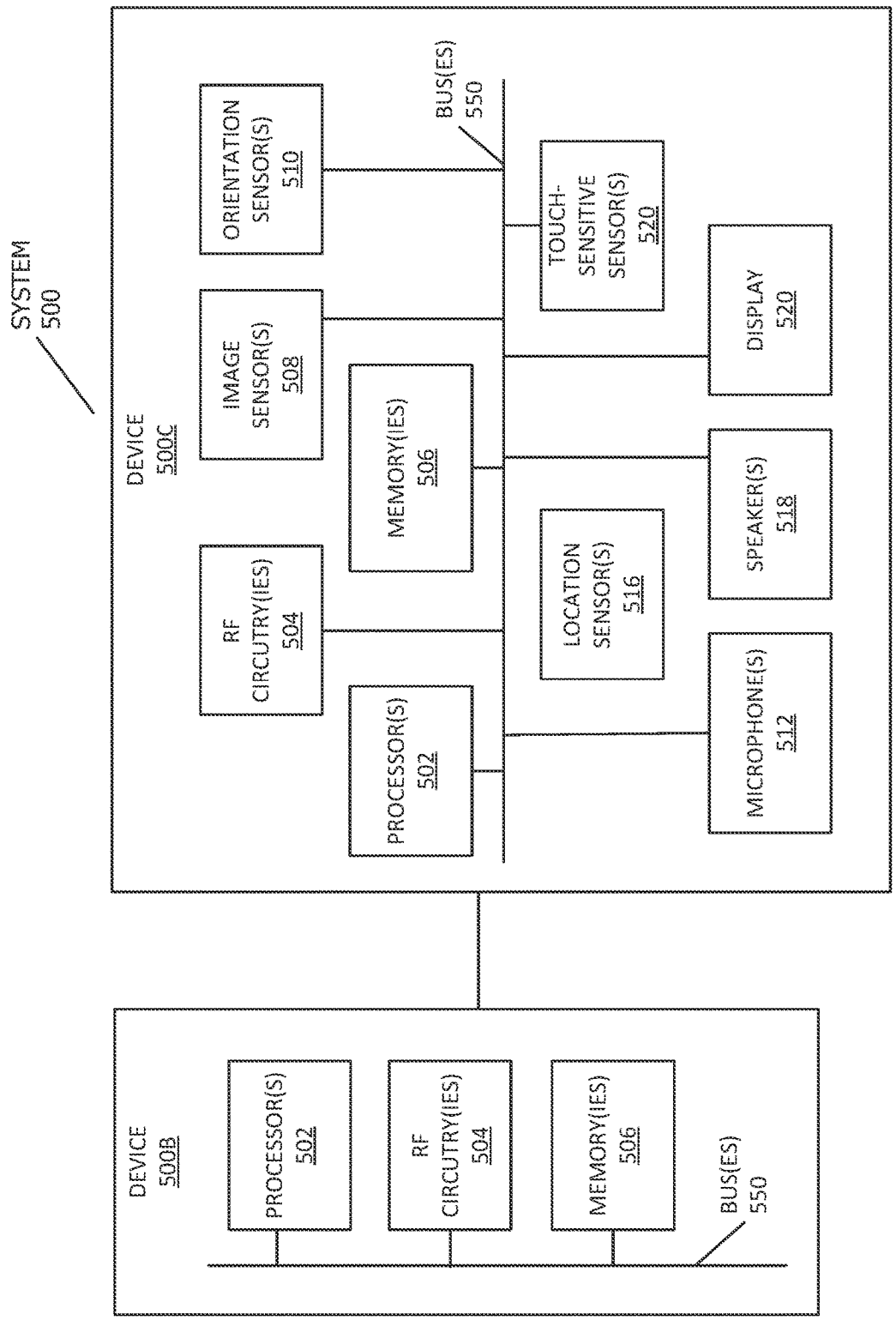

FIG. 5A and FIG. 5B depict exemplary system 500 for use in various extended reality (XR) technologies. In some examples, as illustrated in FIG. 5A, system 500 includes device 500A. Device 500A includes various components, such as processor(s) 502, RF circuitry(ies) 504, memory(ies) 506, image sensor(s) 508, orientation sensor(s) 510, microphone(s) 512, location sensor(s) 516, speaker(s) 518, display(s) 520, and touch-sensitive sensor(s) 522. These components optionally communicate over communication bus(es) 550 of device 500a.

In some examples, elements of system 500 are implemented in a base station device (e.g., a computing device, such as a remote server, mobile device, or laptop) and other elements of system 500 are implemented in a second device (e.g., a head-mounted display device, or "HMD" device). In some examples, device 500A is implemented in a base station device or a second device.

As illustrated in FIG. 5B, in some examples, system 500 includes two (or more) devices in communication, such as through a wired connection or a wireless connection. First device 500B (e.g., a base station device) includes processor(s) 502, RF circuitry(ies) 504, and memory(ies) 506. These components optionally communicate over communication bus(es) 550 of device 500C. Second device 500C (e.g., a head-mounted display device, or "HMD" device) includes various components, such as processor(s) 502, RF circuitry(ies) 504, memory(ies) 506, image sensor(s) 508, orientation sensor(s) 510, microphone(s) 512, location sensor(s) 516, speaker(s) 518, display(s) 520, and touch-sensitive sensor(s) 522. These components optionally communicate over communication bus(es) 550 of device 500C.

System 500 includes processor(s) 502 and memory(ies) 506. Processor(s) 502 include one or more general processors, one or more graphics processors, and/or one or more digital signal processors. In some examples, memory(ies) 506 are one or more non-transitory computer-readable storage mediums (e.g., flash memory, random access memory) that store computer-readable instructions configured to be executed by processor(s) 502 to perform the techniques described below.

System 500 includes RF circuitry(ies) 504. RF circuitry(ies) 504 optionally include circuitry for communicating with electronic devices, networks, such as the Internet, intranets, and/or a wireless network, such as cellular networks and wireless local area networks (LANs). RF circuitry(ies) 504 optionally includes circuitry for communicating using near-field communication and/or short-range communication, such as Bluetooth®.

System 500 includes display(s) 520. Display(s) 520 may have an opaque display. Display(s) 520 may have a transparent or semi-transparent display that may incorporate a substrate through which light representative of images is directed to an individual's eyes. Display(s) 520 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 520 include heads up displays, automotive windshields with the ability to display graphics, windows with the ability to display graphics, lenses with the ability to display graphics, tablets, smartphones, and desktop or laptop computers. Alternatively, system 500 may be designed to receive an external display (e.g., a smartphone). In some examples, system 500 is a projection-based system that uses retinal projection to project images onto an individual's retina or projects virtual objects into a physical setting (e.g., onto a physical surface or as a holograph).

In some examples, system 500 includes touch-sensitive sensor(s) 522 for receiving user inputs, such as tap inputs and swipe inputs. In some examples, display(s) 520 and touch-sensitive sensor(s) 522 form touch-sensitive display(s).

System 500 includes image sensor(s) 508. Image sensors(s) 508 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 508 also optionally include one or more event camera(s) configured to capture movement of physical elements in the physical setting. Image sensor(s) 508 also optionally include one or more depth sensor(s) configured to detect the distance of physical elements from system 500. In some examples, system 500 uses CCD sensors, event cameras, and depth sensors in combination to detect the physical setting around system 500. In some examples, image sensor(s) 508 include a first image sensor and a second image sensor. The first image sensor and the second image sensor are optionally configured to capture images of physical elements in the physical setting from two distinct perspectives. In some examples, system 500 uses image sensor(s) 508 to receive user inputs, such as hand gestures. In some examples, system 500 uses image sensor(s) 508 to detect the position and orientation of system 500 and/or display(s) 520 in the physical setting. For example, system 500 uses image sensor(s) 508 to track the position and orientation of display(s) 520 relative to one or more fixed elements in the physical setting.

In some examples, system 500 includes microphones(s) 512. System 500 uses microphone(s) 512 to detect sound from the user and/or the physical setting of the user. In some examples, microphone(s) 512 includes an array of microphones (including a plurality of microphones) that optionally operate in tandem, such as to identify ambient noise or to locate the source of sound in space of the physical setting.

System 500 includes orientation sensor(s) 510 for detecting orientation and/or movement of system 500 and/or display(s) 520. For example, system 500 uses orientation sensor(s) 510 to track changes in the position and/or orientation of system 500 and/or display(s) 520, such as with respect to physical elements in the physical setting. Orientation sensor(s) 510 optionally include one or more gyroscopes and/or one or more accelerometers.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 3A-3B or the arrangement of elements shown in FIGS. 4 and 5A-5B should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A device, comprising:
a memory;
a display screen; and
one or more processors operatively coupled to the memory, wherein the one or more processors are configured to execute instructions causing the one or more processors to:
obtain a first stereoscopic video, wherein the first stereoscopic video comprises:
a first plurality of first images representing a left stereo eye view;
a second plurality of second images representing a right stereo eye view, wherein each first image in the first plurality has a corresponding second image in the second plurality, and wherein each first image and its corresponding second image comprise a stereoscopic image pair; and
stereoscopic window violation metadata information, wherein the stereoscopic window violation metadata information is determined based on estimated occurrences of stereoscopic window violations in the first stereoscopic video and defines at least one offset value for at least one edge of at least one image in a stereoscopic image pair of the first stereoscopic video; and
modify the first stereoscopic video for presentation on the display screen based, at least in part, on the stereoscopic window violation metadata information, wherein modifying the first stereoscopic video comprises adjusting an alpha value of pixels in an offset region of a given image in the first stereoscopic video.

2. The device of claim 1, wherein the at least one offset value comprises one or more of: a left edge offset, a right edge offset, a top left edge offset, a bottom left edge offset, a top right edge offset, or a bottom right edge offset.

3. The device of claim 1, wherein the at least one offset value comprises a normalized edge offset value.

4. The device of claim 3, wherein the instructions causing the one or more processors to modify the first stereoscopic video for presentation on the display screen based, at least in part, on the stereoscopic window violation metadata information further comprise instructions causing the one or more processors to:
transform the normalized edge offset value into a resolution-specific edge offset value based, at least in part, on a resolution level of the display screen; and
present the first stereoscopic video on the display screen based, at least in part, on the resolution-specific edge offset value.

5. The device of claim 1, wherein the stereoscopic window violation metadata information comprises offset value information encoded according to at least one of: a keyframe encoding scheme; or a difference encoding scheme.

6. The device of claim 5, wherein at least a first offset value for an image in a first stereoscopic image pair of the first stereoscopic video is used to determine a second offset value for an image in a second stereoscopic image pair of the first stereoscopic video.

7. The device of claim 1, wherein the instructions causing the one or more processors to modify the first stereoscopic video for presentation on the display screen based, at least in part, on the stereoscopic window violation metadata information further comprise instructions causing the one or more processors to perform at least one of the following operations:
change a color value of pixels in an offset region of a given image in the first stereoscopic video to black;
change the alpha value of pixels in the offset region of the given image in the first stereoscopic video to zero; or
crop out pixels located in an offset region of a given image in the first stereoscopic video.

8. A non-transitory program storage device comprising instructions stored thereon to cause one or more processors to:
obtain a first stereoscopic video, wherein the first stereoscopic video comprises:
a first plurality of first images representing a left stereo eye view;
a second plurality of second images representing a right stereo eye view, wherein each first image in the first plurality has a corresponding second image in the second plurality, and wherein each first image and its corresponding second image comprise a stereoscopic image pair; and
stereoscopic window violation metadata information, wherein the stereoscopic window violation metadata information is determined based on estimated occurrences of stereoscopic window violations in the first stereoscopic video and defines at least one offset value for at least one edge of at least one image in a stereoscopic image pair of the first stereoscopic video; and
modify the first stereoscopic video for presentation on a display screen based, at least in part, on the stereoscopic window violation metadata information, wherein modifying the first stereoscopic video comprises adjusting an alpha value of pixels in an offset region of a given image in the first stereoscopic video.

9. The non-transitory program storage device of claim 8, wherein the at least one offset value comprises a normalized edge offset value.

10. The non-transitory program storage device of claim 9, wherein the instructions causing the one or more processors to modify the first stereoscopic video for presentation on the display screen based, at least in part, on the stereoscopic window violation metadata information further comprise instructions causing the one or more processors to:
transform the normalized edge offset value into a resolution-specific edge offset value based, at least in part, on a resolution level of the display screen; and
present the first stereoscopic video on the display screen based, at least in part, on the resolution-specific edge offset value.

11. The non-transitory program storage device of claim 8, wherein the stereoscopic window violation metadata information comprises offset value information encoded according to at least one of: a keyframe encoding scheme; or a difference encoding scheme.

12. The non-transitory program storage device of claim 11, wherein at least a first offset value for an image in a first stereoscopic image pair of the first stereoscopic video is used to determine a second offset value for an image in a second stereoscopic image pair of the first stereoscopic video.

13. The non-transitory program storage device of claim 8, wherein the instructions causing the one or more processors to modify the first stereoscopic video for presentation on the display screen based, at least in part, on the stereoscopic window violation metadata information further comprise instructions causing the one or more processors to perform at least one of the following operations:
- change a color value of pixels in an offset region of a given image in the first stereoscopic video to black;
- change the alpha value of pixels in the offset region of the given image in the first stereoscopic video to zero; or
- crop out pixels located in an offset region of a given image in the first stereoscopic video.

14. An image processing method, comprising:
- obtaining a first stereoscopic video, wherein the first stereoscopic video comprises:
- a first plurality of first images representing a left stereo eye view; and
- a second plurality of second images representing a right stereo eye view, wherein each first image in the first plurality has a corresponding second image in the second plurality, and wherein each first image and its corresponding second image comprise a stereoscopic image pair;
- determining stereoscopic window violation metadata information for the first stereoscopic video, wherein the stereoscopic window violation metadata information is determined based on estimated occurrences of stereoscopic window violations in the first stereoscopic video and defines at least one offset value for at least one edge of at least one image in a stereoscopic image pair of the first stereoscopic video; and
- combining the stereoscopic window violation metadata information with the first stereoscopic video, wherein combining the stereoscopic window violation metadata information with the first stereoscopic video comprises adjusting an alpha value of pixels in an offset region of a given image in the first stereoscopic video.

15. The method of claim 14, wherein the at least one offset value comprises one or more of: a left edge offset, a right edge offset, a top left edge offset, a bottom left edge offset, a top right edge offset, or a bottom right edge offset.

16. The method of claim 14, wherein the at least one offset value comprises a normalized edge offset value.

17. The method of claim 14, wherein the stereoscopic window violation metadata information for the first stereoscopic video further comprises an array of at least one offset value for at least one edge of an image in a stereoscopic image pair of the first stereoscopic video.

18. The method of claim 14, wherein the stereoscopic window violation metadata information comprises offset value information encoded according to at least one of: a keyframe encoding scheme; or a difference encoding scheme.

19. The method of claim 18, wherein at least a first offset value for a first image in a first stereoscopic image pair of the first stereoscopic video is used to determine a second offset value for a second image in a second stereoscopic image pair of the first stereoscopic video.

20. The method of claim 14, wherein the stereoscopic window violation metadata information comprises a timed stereoscopic window violation metadata track associated with the first stereoscopic video.

* * * * *